United States Patent
Schuermann et al.

(10) Patent No.: US 6,198,764 B1
(45) Date of Patent: Mar. 6, 2001

(54) METHOD FOR THE TRANSFER OF A DIGITAL DATA SIGNAL FROM A TRANSMITTER TO A RECEIVER

(75) Inventors: Josef H. Schuermann, Oberhummel; Jurgen Anton Mayer, Kissing, both of (DE)

(73) Assignee: Texas Instruments Deutschland GmbH, Freising (DE)

( * ) Notice: Subject to any disclaimer, the term of this patent is extended or adjusted under 35 U.S.C. 154(b) by 0 days.

(21) Appl. No.: 09/168,559

(22) Filed: Oct. 8, 1998

(30) Foreign Application Priority Data

Oct. 8, 1997 (DE) .............................. 197 44 428

(51) Int. Cl.[7] .............................. A61F 2/06; H04L 27/30
(52) U.S. Cl. .............................................. 375/130
(58) Field of Search ..................... 375/130, 131, 375/133, 134, 135, 136, 137, 354

(56) References Cited

U.S. PATENT DOCUMENTS

| | | | |
|---|---|---|---|
| 5,066,957 | * 11/1991 | Mizuno et al. | 342/352 |
| 5,144,639 | * 9/1992 | Uchida et al. | 375/142 |
| 5,311,541 | * 5/1994 | Sanderford, Jr. | 375/131 |
| 5,377,222 | * 12/1994 | Sanderford, Jr. | 375/131 |
| 5,511,090 | * 4/1996 | Denton et al. | 370/342 |
| 5,724,383 | * 3/1998 | Gold et al. | 375/142 |
| 5,960,040 | * 9/1999 | Cai et al. | 375/279 |

* cited by examiner

*Primary Examiner*—Stephen Chin
*Assistant Examiner*—Lenny Jiang
(74) *Attorney, Agent, or Firm*—Pedro P. Hernandez; W. James Brady, III; Frederick J. Telecky, Jr.

(57) ABSTRACT

In the transferring of a digital data signal from a transmitter to a receiver using the spread spectrum technique, the data signal is modulo-2 added with a PN code sequence, the bit rate of which is very much higher than the bit rate of the data signal. A carrier is then modulated and transmitted with the thereby resulting spread data signal. In the receiver, the modulated carrier is demodulated and the demodulated signal, to obtain the digital data signal, is multiplied with a PN code sequence produced in the receiver, coinciding and synchronized with the PN code sequence of the transmitter. In the transmitter, the carrier is modulated by FSK- or BPSK-modulation with the spread data signal. In addition, modulation is carried out by means of the respectively other of these two modulation types with a synchronizing signal representing the synchronizing information of the the PN code sequence. In the receiver the modulated carrier is demodulated by means of a quadrature demodulator, from the output signal of which then both the spread data signal and also the synchronizing signal can be derived by filtering.

7 Claims, 1 Drawing Sheet

Figure 1:
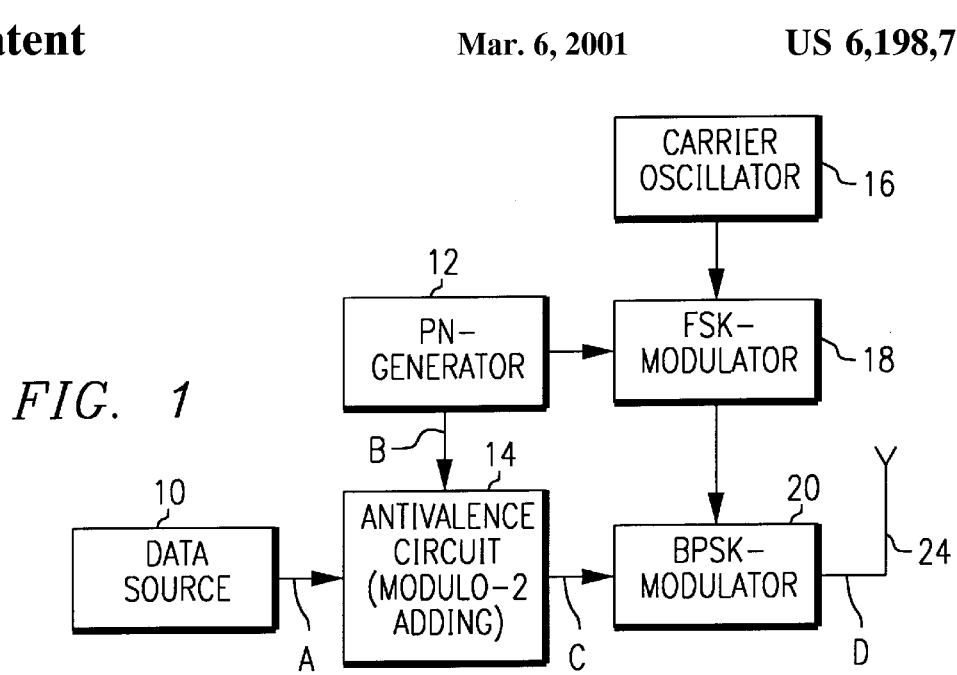

METHOD FOR THE TRANSFER OF A DIGITAL DATA SIGNAL FROM A TRANSMITTER TO A RECEIVER

BACKGROUND OF THE INVENTION

The invention relates to a method for the transfer of a digital data signal from a transmitter to a receiver using the spread spectrum technique, in which the data signal is modulo-2 added with a PN code sequence, the bit rate of which is very much higher than the bit rate of the data signal, then a carrier is modulated with the thereby resulting spread data signal, the modulated carrier is transmitted, in the receiver the modulated carrier is demodulated and the demodulated signal, to obtain the digital data signal, is multiplied with a PN code sequence produced in the receiver, coinciding and synchonized with the PN code sequence of the transmitter.

DESCRIPTION OF THE RELATED ART

Data transfer methods which operate using the spread spectrum technique, are used especially when a high suppression of spurious signals is to be achieved under unfavourable transfer conditions. The principles of the spread spectrum technique are described for example in the "Taschenbuch der Hochfrequenztechnik", 5th edition 1992, publ. Springer-Verlag, Chapter 0 46 ff. It is also indicated there that this technique was used hitherto in particular in the field of air and space travel for the transfer of information under particularly difficult conditions. Also in fields in which a particular protection against interception is involved, for example in radar technology and navigation, this spread spectrum technique was frequently used. A type of spread spectrum technique is the so-called direct sequence method (DS method), in which the signal which is to be transferred, which is present in digital form, is modulated with a PN code sequence (in which PN stands for "Pseudo Noise"), which is provided so that a spreading of the signal which is to be transferred is achieved. Here, the possibility exists of modulating the data signal to be transferred before spreading onto a carrier and then spreading the modulated carrier or else only spreading the data signal to be transferred and then modulating the spread signal onto the carrier. On the receiver side, the data signal is recovered by the spread signal being unspread again by mixing in the PN code sequence. This unspreading process can be carried out using an autocorrelation stage. The PN code sequences used in the spread spectrum transfer methods hitherto have a very great length and are generally produced with binary shift registers. For this, a relatively great circuitry expenditure is necessary, so that the spread spectrum technique has not been used in data transfer systems which are to be realized expending as little cost as possible. As a result of the use of the very long PN code sequences, the autocorrelation process also takes up a relatively great deal of time, because firstly the PN code produced on the receiver side has to be synchonized with the PN code sequence contained in the received signal, so that the unspreading process can be carried out.

In applications in which a very quick synchronisation of the PN code sequence must be achieved on the receiver side, transfer methods are less suitable in which the synchronisation is achieved by autocorrelation. Transfer methods have already been used in which in addition to the information to be transferred from the transmitter, a reference code is transmitted which is used on the receiver side for synchronisation of the PN code sequence. Such a method is described for example in "UKW-Berichte", 2/84, pages 90 ff. This method is unsuitable for applications in which low costs are important on the transmitter side.

BRIEF SUMMARY OF THE INVENTION

The invention is based on the problem of providing a method of the type initially mentioned, in which on the receiver side a very quick synchronisation can be achieved of the PN code sequence produced in the receiver with the PN code sequence contained in the received signal, using simple circuit means without great expenditure.

This is achieved according to the invention in that in the transmitter, the carrier is modulated by FSK- or BPSK modulation with the spread data signal and in addition by means of the respectively other of these two modulation types is modulated with a synchronizing signal representing the synchronizing information of the PN code sequence, and that in the receiver the modulated carrier is demodulated by means of a quadrature demodulator, from the output signal of which both the spread data signal and also the synchronizing signal can be derived by filtering.

In the method according to the invention, in addition to the information which represents the data to be transferred, information is also transferred which represents the synchronizing status of the PN code sequence. For the transfer of these two pieces of information, the FSK modulation and the BPSK modulation are used, it being immaterial which of these modulation types is used for respectively one of the two pieces of information to be transferred. Since with the use of this method, on the receiver side immediately after reception of the transmitted signal, a piece of information is available concerning the synchronizing status of the PN code sequence used on the transmitter side for spreading the data signal, on the receiver side a synchonized PN code sequence can be produced very quickly, so that the unspreading process can be carried out correspondingly quickly.

An advantageous further development of the method according to the invention consists in that the PN code sequence is selected so that the associated synchronizing signal has a substantially lower bit rate than the spread data signal, that for modulating the carrier for the spread data signal the BPSK modulation is used and for the synchronizing signal the FSK modulation is used, and that in the receiver the output signal of the quadrature demodulator is transferred through a low pass filter to obtain the synchronizing signal and through a high pass filter to obtain the spread data signal.

BRIEF SUMMARY OF THE INVENTION

Figure 2:
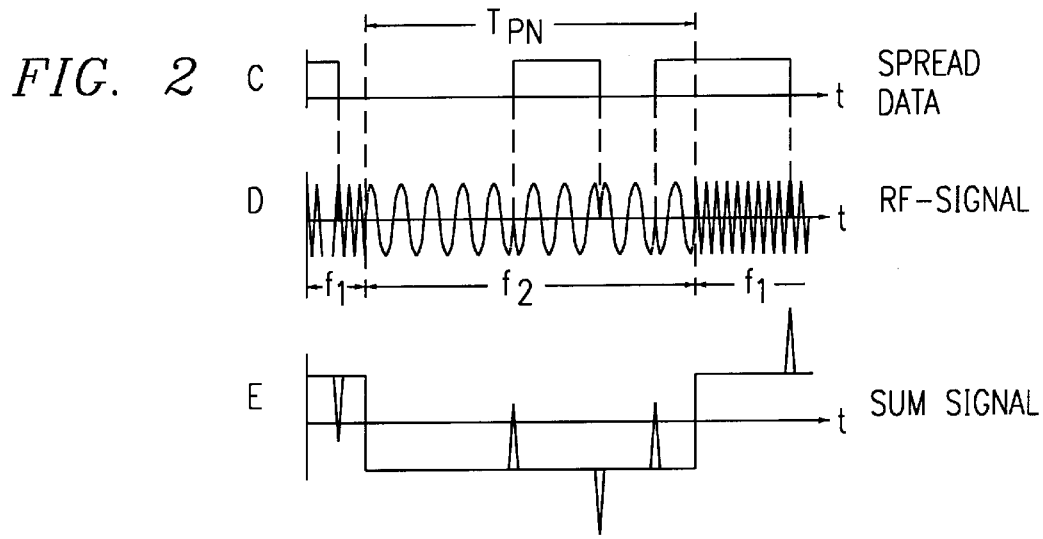
Figure 3:
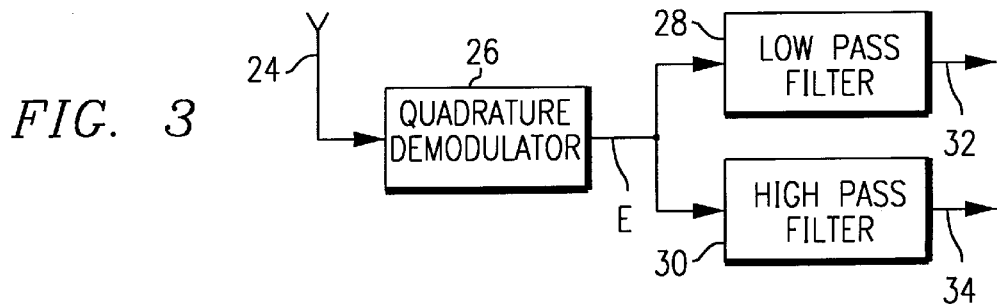

An embodiment of the invention is now explained in further detail with reference to the drawing. In the drawing:

FIG. 1 shows a schematic block diagram of a transmitter for the application of the method according to the invention, FIG. 2 shows time diagrams of signals which occur at points A, B, C and D in FIG. 1 and also at E in FIG. 3, and FIG. 3 shows a schematic block diagram of the essential individual parts of a receiver to carry out the method according to the invention, for an understanding of the method according to the invention.

DETAILED DESCRIPTION OF THE INVENTION

The transmitter illustrated schematically in FIG. 1 contains a data source 10 which emits data in the form of digital signals. An example of such a data signal is illustrated at A in FIG. 2. A PN generator 12 produces a PN code sequence as is illustrated at B in FIG. 2. This PN code sequence has a substantially higher bit rate than the data signal. In an antivalence circuit 14 the data with the PN code sequence from the PN generator 18 are subjected to a modulo-2-addition. Through this modulo-2-addition, the spectrum of the data signal is spread so that at the output of the antivalence circuit 14 a data signal with a spread spectrum is available. In FIG. 2, this signal with a spread spectrum is illustrated at C.

The transmitter contains a carrier oscillator 16, which produces the carrier frequency by which the information is to be transmitted. The carrier is firstly modulated by means of a FSK modulator 18 with a signal which comes from the PN generator and represents the synchronizing inofrmation of the PN code sequence. This signal can be a rectangular signal, for example, which in each case has an edge at the start of the PN code sequence. For example, at the start of the first PN code sequence, it has a positive edge, at the start of the second PN code sequence it has a negative edge, at the start of the third PN code sequence it has a positive edge again, etc. Between the edges in each case it has the same level. This signal therefore defines the respective start times of the PN code sequence and therefore represents synchronizing information of this code sequence. The FSK modulation in the FSK modulator 18 has the result that the carrier frequency undergoes a frequency lobe switching with each edge of the signal supplied to it from the PN generator 12, so that it assumes the values $f_1$ and $f_2$ alternately, as can be seen at D in FIG. 2.

The output signal of the FSK modulator is then subjected to a phase modulation in a BPSK modulator 20, with the spread data signal from the antivalence circuit 14 serving as modulation signal. This BPSK modulator 20 has the result that with each edge of the spread data signal, in the output signal of the FSK modulator a phase shift keying takes place by 180°. The abbreviation "BPSK" in this instance means "Binary Phase Shift Keying".

The HF signal transmitted from antenna 22, illustrated at d in FIG. 2, contains through the double modulation both information concerning the spread data and also synchronizing information concerning the PN code sequence used for spreading.

In the receiver, demodulation can be carried out in a quadrature demodulator 26 from the transmitted HF signal which is received by the antenna 24 according to FIG. 3. This quadrature demodulator 26 delivers at its output a sum signal as can be seen at E in FIG. 2. This signal consists of two signals superimposed on each other, one of which is a rectangular signal, the edges of which lie at a distance from the start times of the PN code sequence, whilst the other signal consists of individual impulses which occur in each case at the point at which the spread data have an impulse edge.

As the synchronizing information, due to FCC regulations, must have a frequency which is at least ten times lower than the frequency of the spread data, the two signals contained in the sum signal can be separated from each other very easily by the sum signal being sent through a low pass filter 28 and through a high pass filter 30. The low pass filter emits at its output 32 the signal representing the synchronizing information with the lower frequency, whilst the high pass filter emits at its output 34 the signal representing the spread data with the higher frequency. The synchronizing information from the low pass filter 28 can then be used for the synchronizing of the PN code sequence produced in the receiver in the conventional manner in its own generator, and the thus produced synchronised PN code sequence can be multiplied with the spread data from the high pass filter 30 for the recovery of the spread in data, as is usual in the spread spectrum technique.

The synchronizing of the PN code sequence can be carried out very quickly in the receiver, because the synchronizing information is contained in the received signal, so that it is not necessary to carry out the synchronizing by means of a time-consuming autocorrelation process. In applications in which only very short data telegrams are transferred, this is a great advantage.

What is claimed is:

1. A method for the transfer of a digital data signal from a transmitter to a receiver using a spread spectrum technique, comprising the steps of:

modulo-2 adding the digital data signal with a pseudo noise (PN) code sequence of the transmitter to generate a spread data signal;

modulating a carrier with the spread data signal;

transmitting the modulated carrier;

demodulating the modulated carrier in the receiver; and multiplying the demodulated signal with a PN code sequence produced in the receiver which coincides and is synchronized with the PN code sequence of the transmitter, to obtain the digital data signal, and in the transmitter the carrier is modulated using a first or second modulation type with the spread data signal, and in addition, the respective other of these two modulation types is modulated with a synchronizing signal representing the synchronizing information of the PN code sequence of the transmitter.

2. The method according to claim 1, wherein the first modulation type comprises FSK modulation and the second modulation type comprises PBSK modulation.

3. The method according to claim 2, wherein the PN code sequence is selected so that the associated synchronizing signal has a substantially lower bit rate than the spread data signal, and BPSK modulation is used for the spread data signal and the FSK modulation is used for the synchronizing signal.

4. The method according to claim 1, wherein in the receiver the modulated carrier is demodulated using a quadrature demodulator.

5. The method according to claim 4, wherein the quadrature demodulator provides an output signal and the method further comprises the steps of:

low pass filtering the output signal provided by the quadrature demodulator to obtain the synchronizing signal; and high pass filtering the output signal provided by the quadrature demodulator to obtain the spread spectrum signal.

6. The method according to claim 1, wherein the spread data signal has a bit rate which is higher than the bit rate of the digital data signal.

7. The method according to claim 1, wherein the PN code sequence of the transmitter is selected so that the associated synchronizing signal has a substantially lower bit rate than the spread data signal.

* * * * *